Dec. 21, 1965  A. DI NARDO  3,224,879
PROCESS FOR PRODUCING A COFFEE EXTRACT
Filed July 23, 1962

INVENTOR.
BY Albert DiNardo
Wilfred Baranuck
ATTORNEY

United States Patent Office 3,224,879
Patented Dec. 21, 1965

3,224,879
PROCESS FOR PRODUCING A
COFFEE EXTRACT
Albert Di Nardo, North Reading, Mass.; Eleanor Di
Nardo, administratrix of said Albert Di Nardo,
deceased
Filed July 23, 1962, Ser. No. 211,677
1 Claim. (Cl. 99—71)

This invention relates to coffee and more particularly to an improved process for producing a coffee extract or infusion from which an instant or soluble coffee extract or product in the form of a dry powder or liquid concentrate can be prepared.

A principal object of the present invention is to provide an improved process for extracting desirable soluble coffee solids from coffee beans or grounds to produce a coffee extract from which water soluble coffees having exceptionally good taste and aroma characteristics can be prepared.

Another object of the invention is to provide a coffee extraction process wherein the yield of desirable soluble coffee solids from a given weight of coffee may be increased by a controlled hydrolysis of coffee beans or grounds which have been previously extracted with water.

Another object of the invention is to provide a coffee extraction process wherein the aqueous extraction and the hydrolysis of coffee beans or grounds are carried out substantially simultaneously so as to produce a single coffee extract or infusion which contains water-soluble hydrolysis product in addition to other desirable water-soluble coffee solids.

Still another object of the invention is to provide an extraction process of the above type wherein appreciably extracted coffee beans or grounds are contacted with water and a hydrolysis agent and the aqueous extract obtained therefrom then brought into contact with fresher coffee.

Still another object of the invention is to provide an extraction process of the above type wherein no recovery, neutralization or destruction of the hydrolysis agent employed is required.

A further object of the invention is to provide a simple and economical coffee extraction process for producing high yields of soluble coffee solids which are indistinguishable in flavor, taste and aroma from products produced without using a hydrolysis step.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claim.

Figure 1:
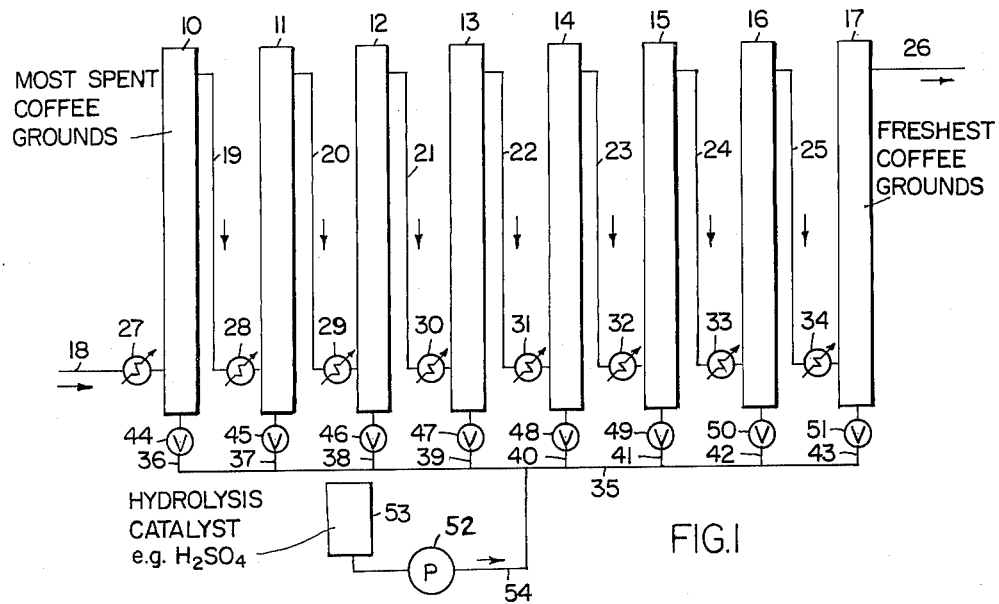
Figure 2:
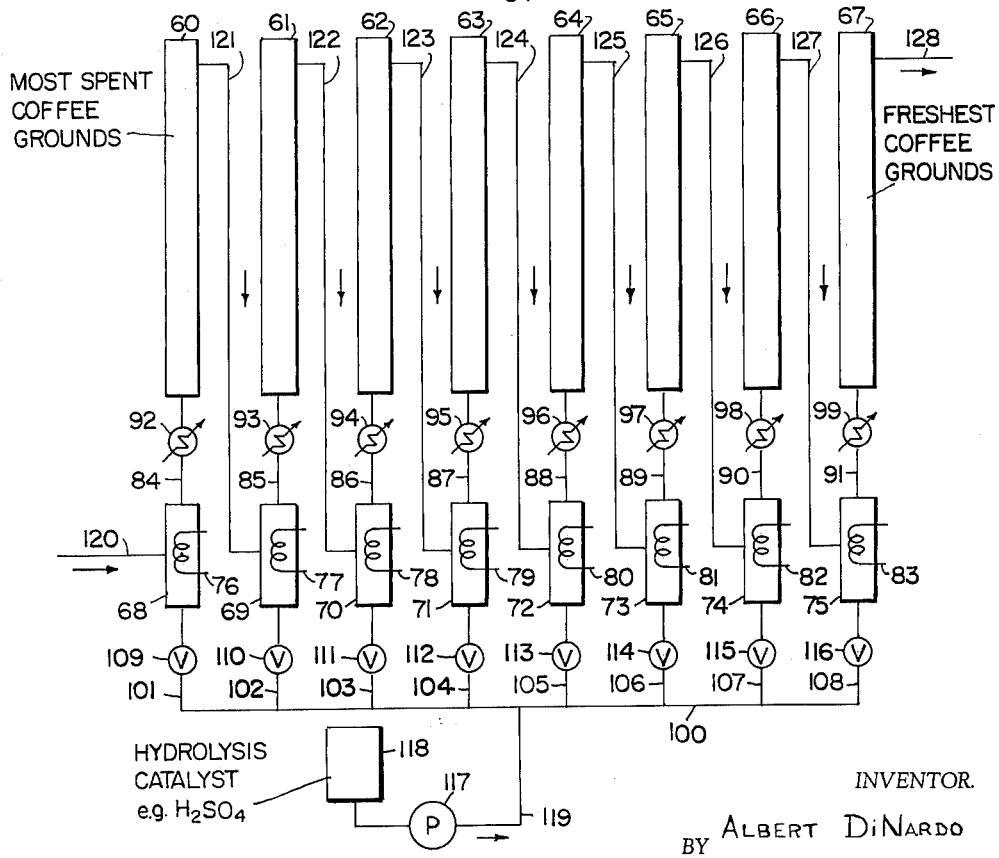

For a fuller understanding of the nature and objects of the invention, reference should be had to the following detailed description taken in connection with the accompanying drawing wherein:

FIGURE 1 is a diagrammatic flow sheet illustrating one embodiment according to which the process may be practiced; and FIG. 2 is a diagrammatic flow sheet illustrating another embodiment according to which the process may be practiced.

It is well known that instant or soluble coffees can be prepared from a coffee extract obtained by contacting coffee, preferably ground, roasted coffee, for a suitable period of time with an aqueous extraction liquid maintained at an appropriate temperature and pressure so as to extract water-soluble solids therefrom. Generally, the coffee extract is prepared with hot water using batch, i.e., semi-continuous or continuous countercurrent extraction procedures. In one commercial procedure widely practiced today, a coffee extract is produced by forcing or passing an aqueous extraction liquid through an extraction system comprising a plurality of columns containing ground, roasted coffee. The coffee grounds are extracted by countercurrent extraction with water, that is, the aqueous extraction liquid is fed into the extraction system so that it first contacts the most extracted or spent coffee grounds, then passed through progressively fresher coffee grounds contained in successive extraction columns and finally withdrawn from the system as the desired coffee extract. The concentration of water-soluble coffee solids in the aqueous extraction liquid is continuously increased as the extraction liquid contacts the fresher coffee grounds. The temperature of the aqueous extraction liquid passing through the coffee grounds and the pressure of the extraction system are usually controlled so that primarily only soluble coffee solids having desirable taste, flavor and aroma characteristics are extracted from the coffee grounds.

In order to provide a more economical soluble coffee of a quality at least equivalent to consumer acceptable soluble coffees, considerable effort has been directed towards increasing the yield of desirable water-soluble coffee solids from a given weight of coffee grounds without at the same time producing or extracting soluble coffee solids with undesirable taste or flavor characteristics. Among the various methods heretofore considered for increasing the yield of soluble coffee solids, it has been proposed to subject the coffee grounds to severe extraction conditions, i.e., higher temperatures and pressures. Although the use of severe temperature and pressure extraction conditions does result in the production of higher yields of solubles, such solubles are not satisfactory due to the inclusion therein of solubles having undesirable flavor, taste and aroma characteristics. In other words, such conditions not only result in the extraction of desirable coffee solids including small amounts of desirable coffee hydrolysis product which may be obtained under such conditions but they also result in the extraction of undesirable coffee solids.

It has also been proposed heretofore to subject spent coffee grounds to a hydrolysis to produce a water-soluble, essentially tasteless coffee derivative. For example, in U.S. Patents 2,573,406 and 2,687,355, the coffee grounds are first extracted with water to produce a primary extract and the spent coffee grounds resulting from such water extraction are then subjected to an acid hydrolysis to produce a secondary extract comprising a water-soluble, essentially tasteless derivative of coffee which is recovered separately from the primary extract. The two extracts are then mixed in a predetermined ratio to provide the desired soluble coffee. According to such prior art processes, the extraction of coffee grounds with water and the subsequent acid hydrolysis of the spent coffee grounds to produce substantial yields of a desirable hydrolysis product involved two independent and separate extraction steps. Moreover, the acid hydrolysis of the spent coffee grounds as heretofore proposed required at least the additional steps of neutralizing the acid agent employed and the separation or removal of solids, such as water insoluble salt formed by the neutralization of the acid hydrolysis agent and waste coffee grounds, from the secondary extract containing dissolved hydrolysis product. In the present invention, the yield of desirable water-soluble coffee solids may be increased without at the same time extracting or producing undesirable soluble coffee solids by hydrolyzing appreciably extracted coffee grounds to produce a water-soluble, essentially tasteless coffee derivative; the hydrolysis of said extracted coffee grounds being carried out substantially concurrently with the water extraction of the coffee grounds in the system so as to provide a single extract containing hydrolysis product in addition to the other desirable soluble coffee solids extracted. Moreover, the present controlled hydrolysis of appreciably extracted coffee grounds is carried out such that the addition of a neutralizing agent is not required to remove the hydrolysis agent utilized.

Briefly the extraction process of the present invention comprises passing an aqueous extraction liquid through ground coffee so as to countercurrently contact progressively fresher ground coffee, contacting at least a portion of the appreciably extracted ground coffee with a hydrolysis agent to effect hydrolysis thereof while continuing the passage of aqueous extraction liquid through the ground coffee, and recovering an aqueous extract containing soluble coffee solids including an essentially tasteless hydrolysis product.

In order not to appreciably modify or change the quality of the end product, preferably only appreciably extracted ground coffee, i.e., ground coffee which has had at least 15 percent by weight thereof extracted as soluble solids, are subjected to hydrolysis treatment. Either an alkaline or acid hydrolysis may be utilized to hydrolyze appreciably extracted coffee grounds. Preferably, however, the hydrolysis is carried out using an acid hydrolysis agent such as an inorganic acid, for example, sulfuric acid, phosphoric acid or the like. It has been found that extracted coffee grounds form an active adsorbent mass which readily adsorbs hydrolysis agent. The adsorption of hydrolysis agent thus provides for the elimination of any recovery, neutralization or destruction of hydrolysis agent and permits the hydrolysis of appreciably extracted coffee grounds to be carried out concurrently with the aqueous extraction of the coffee grounds. In order to prevent the presence of hydrolysis agent in the recovered coffee extract, it is preferable that the aqueous extraction liquid passing from the column or zone into which the hydrolysis agent it introduced thereafter pass through a sufficient quantity of adequately extracted coffee grounds so that any hydrolysis agent which may be contained therein may be adsorbed and removed from from the extraction liquid.

Referring now to FIGURE 1 which illustates one embodiment of an apparatus for carrying out the extraction process of the invention, there is shown a plurality of successive extraction columns 10, 11, 12, 13, 14, 15, 16 and 17. Each column is adapted to suitably hold a charge of coffee, preferably ground, rotated coffee. Although an eight column extraction system is illustrated, more or less extraction columns may be utilized. Each extraction column is provided with suitable means (not shown) at its upper end through which fresh coffee grounds may be charged thereto and with suitable means (also not shown) through which spent coffee grounds may be removed or discharged therefrom.

Extraction column 10 is provided at the lower end or portion thereof with an inlet line or pipe 18 through which the extraction liquid is fed into the extraction system. The extraction liquid is preferably water although it may be a dilute aqueous solution containing soluble coffee solids. A line 19 connects the upper end or portion of extraction column 10 to the lower end or portion of the next succeeding extraction column 11. Line 20 connects the upper portion of column 11 to the lower portion of column 12. Likewise, line 21 connects columns 12 and 13, line 22 connects columns 13 and 14, line 23 connects columns 14 and 15, line 24 connects columns 15 and 16, and line 25 connects columns 16 and 17. The coffee extract, that is, the aqueous solution containing the desired concentration of soluble coffee solids, is withdrawn or discharged from the extraction system through outlet line 26 which extends from the upper portion of column 17.

A heat exchanger 27, 28, 29, 30, 31, 32, 33 and 34 is positioned in each of lines 18, 19, 20, 21, 22, 23, 24 and 25 just before they enter the lower portion of the extraction columns. An appropriate heat exchange medium, e.g., steam or hot or cold water may be suitably passed through the heat exchanger to modify or maintain the temperature of the aqueous extraction liquid passing into each of the extraction columns. Instead of providing heat exchangers in each of the above-mentioned lines, each extraction column may be provided with a jacket (not shown) through which a suitable heat exchange medium may be circulated so as to provide the desired temperature control. Likewise a combination of line heat exchangers and extractor column jackets may also be provided.

The lower portion of each extraction column is connected to a manifold 35 by means of a line or pipe 36, 37, 38, 39, 40, 41, 42 and 43. Each of said lines is fitted with a suitable valve 44, 45, 46, 47, 48, 49, 50 and 51. A metering pump 52 is provided to feed a predetermined amount of hydrolysis agent from a suitable supply 53 through line 54 into manifold 35 and into an extraction column when the appropriate valve is opened.

In FIG. 2, there is shown another embodiment of an apparatus for accomplishing the extraction process of the present invention. In this embodiment, there is provided a plurality of successive extraction columns 60, 61, 62, 63, 64, 65, 66 and 67 in which ground, roasted coffee is packed or charged. Each extraction column is provided with a mixing chamber 68, 69, 70, 71, 72, 73, 74 and 75 in which the aqueous extraction liquid from the preceding column is intimately mixed with hydrolysis agent prior to being introduced into the lower portion of the extraction column. A heat exchange line 76, 77, 78, 79, 80, 81, 82 and 83 is provided in each of the mixing chambers through which a suitable heat exchange medium, e.g., cold water, may be circulated. Each mixing chamber may be provided with a line (not shown) for the injection or introduction of water into the mixing chamber. The water injection may be used to help dilute hydrolysis agent, e.g., acid which may be fed into the mixing chamber. The dilution of, for example, acid particularly concentrated acid at this point helps to reduce or eliminate carbonization of soluble coffee solids particularly the soluble solids in the aqueous extraction liquid and the formation of scum. The lower end or portion of each column is connected to a mixing chamber by means of a line 84, 85, 86, 87, 88, 89, 90 and 91. Each of said lines is fitted with a heat exchanger 92, 93, 94, 95, 96, 97, 98 and 99.

The lower portion of each mixing chamber is connected to a manifold 100 by means of a line 101, 102, 103, 104, 105, 106, 107 and 108. Each of said lines is fitted with a suitable valve 109, 110, 111, 112, 113, 114, 115 and 116. A low volume, positive displacement metering pump 117 is provided to introduce a predetermined quantity of hydrolysis agent from a suitable supply 118 through line 119 into manifold 100 and into a mixing chamber and the extraction column associated therewith when the appropriate valve is open.

Mixing chamber 68 is provided with an inlet line 120 through which the extraction liquid, e.g., water is fed into the extraction system. A line 121 connects the upper portion or end of column 60 to mixing chamber 69. Line 122 joins the upper portion of column 61 to mixing chamber 70. Likewise, line 123 connects column 62 to mixing chamber 71, line 124 connects column 63 to mixing chamber 72, line 125 connects column 64 to mixing chamber 73, line 126 connects column 65 to mixing chamber 74 and line 127 connects column 66 to mixing chamber 75. The coffee extract consisting essentially of water and a desired concentration of soluble coffee solids is recovered or drawn off from the extraction system via outlet line 128 which extends from the upper portion of column 67.

The typical operation of the present extraction process will be described in connection with the systems set forth in the figures wherein it is assumed that steady operating conditions prevail. In the operation of the process utilizing the system shown in FIGURE 1, after steady operating conditions are achieved, column 10 contains the most spent or exhausted coffee grounds. The successive columns contain progressively fresher coffee grounds; the freshest coffee grounds being contained in column 17. The highly extracted coffee grounds in the first columns of the system, for example, columns 10, 11 and 12 contain or hold substantial amounts of hydrolysis agent which was previously fed in predetermined amounts into each of the columns. Under the conditions which exist during steady operation of the extraction process, water is forced through line 18 and suitably heated as it passes through heat exchanger 27 to a temperature preferably between about 240° F. and 350° F. This hot water is introduced into the lower or bottom portion of extraction column 10 and passed through the remaining columns in succession, from bottom to top, as indicated by the flow arrows. Thus, the coffee grounds are countercurrently extracted by passing hot water first into contact with the most spent coffee grounds and then through the progressively fresher coffee grounds; the solution of soluble solids passing out of the system through the column containing the freshest coffee grounds. The pressure within the extraction column is preferably controlled so as to maintain liquid phase operations during the coffee extraction. The temperature of the water or aqueous extractant may be maintained substantially constant as it passes through each of the columns or the temperature of the water may be varied as it passes through the extraction system. For example, the water may be maintained at a high temperature, e.g., 300° F. as it passes through the columns containing appreciably extracted coffee grounds, e.g., columns 10, 11, 12 and 13 and then maintained at a lower temperature than that first utilized, e.g., 200° F. as it passed through the columns containing the fresher coffee grounds, e.g., column 14, 15, 16 and 17.

The feeding of hydrolysis agent into column 12 having been completed, valve 47 is opened, all other valves now being closed, so that the metering pump 52 provides a continuous predetermined feed of hydrolysis agent, e.g., sulfuric acid into column 13 which contains appreciably extracted coffee grounds, i.e., coffee grounds which have had at least 15 percent by weight thereof extracted as soluble solids. The aqueous extraction liquid from column 12 is fed into and passed through column 13 simultaneously with the introduction of hydrolysis agent thereinto. The flow of hydrolysis agent into column 13 is continued throughout the aqueous extraction period which may range from about 20 minutes to about 90 minutes; this time also being sufficient to achieve hydrolysis of coffee grounds in columns 10, 11, 12 and 13 as well as coffee grounds in one or more of the columns following column 13, e.g., columns 14 and 15, which may be contacted with hydrolysis agent carried over from column 13. The essentially tasteless hydrolysis product obtained from the above-mentioned coffee grounds is dissolved in the water passing through the columns so that the extract withdrawn from column 17 via line 26 contains a substantial amount of hydrolysis product in addition to other desirable soluble coffee solids extracted by the water.

It has been found that extracted coffee grounds, particularly coffee grounds which have been appreciably extracted, form an active adsorbent mass which readily adsorbs hydrolysis agent. Thus hydrolysis agent fed into column 13 is for the most part adsorbed by the extracted coffee grounds therein. Hydrolysis agent carried from column 13 is adsorbed by extracted coffee grounds contained in the succeeding column or columns. The adsorption of hydrolysis agent by adequately extracted coffee grounds thus eliminates the need for recovering, neutralizing or destroying the hydrolysis agent added into the system. To prevent hydrolysis agent from being withdrawn in the extract and from contacting grounds which have not been sufficiently extracted, i.e., not extracted of at least 15 percent by weight of soluble solids, it is preferable that a sufficient quantity of adequately extracted coffee grounds be present following the column or zone into which the hydrolysis agent is fed. Thus, in the column or columns immediately following the column into which the hydrolysis agent is introduced, there is preferably present a quantity of appreciably extracted coffee grounds which is sufficient to adsorb hydrolysis agent which may be brought into contact therewith. If desired, additional columns containing adequately extracted coffee grounds may be provided between the column into which the hydrolysis agent is introduced and the columns containing the fresher grounds which have not as yet been extracted to the desired degree or level.

The increase in the yield of desirable solids can be varied by regulating the amount of hydrolysis agent fed to the columns. Generally, the greater the amount of hydrolysis agent brought into contact with the appreciably extracted coffee grounds, the higher the yield of soluble product. For example, in one run wherein concentrated sulfuric acid was employed as the agent an increase of about 4 percent in the yield of soluble product from a given weight of coffee grounds was achieved by feeding about 0.0040 pound of sulfuric acid per pound of dry coffee grounds. In another run wherein the coffee grounds to be hydrolyzed were of a similar blend and roast as those employed in the aforementioned run, and also extracted to a similar level, a 12 percent increase in the yield of soluble product was obtained by adding about 0.010 pound of sulfuric acid per pound of dry coffee grounds charged. This latter run was carried out under the same process conditions as the first mentioned run.

When the desired portion or percentage of solubles are extracted from the coffee grounds in column 10, column 10 is cut out from the extraction system. Simultaneously, a column charged with fresh ground, roasted coffee is connected into the system so as to follow column 17. Valve 47 is closed and valve 48 is opened so as to provide a continuous predetermined feed of hydrolysis agent into extraction column 14. When the desired portion of solubles in the coffee grounds in column 11 are extracted, it is disconnected from the system and a simultaneously fresh column is suitably placed on stream. Valve 48 is closed and valve 49 is now opened and the procedure repeated. The extraction of the soluble solids is preferably regulated so that the aqueous extract or solution withdrawn from the system contains between about 15 to about 35 percent by weight of soluble solids. The coffee extract obtained by simultaneously carrying out the hydrolysis of appreciably extracted coffee grounds and the water extraction of coffee grounds may be treated according to well-known procedures to produce dry soluble coffee particles or powder or concentrated coffee solutions or syrups.

The operation of the process utilizing the system illustrated in FIG. 2 is similar to that described in connection with FIGURE 1 except, however, that the hydrolysis agent when fed is first thoroughly or intimately mixed with aqueous extraction liquid and the resultant extraction solution then introduced into the appropriate column containing appreciably extracted coffee grounds. As the hydrolysis agent and aqueous extraction liquid are mixed, it may be necessary to cool the mixture in order to dissipate any heat which may be generated by their contact. By rapidly dissipating any heat at this time and thus preventing excessively high temperatures, degradation of coffee solids dissolved in the aqueous extraction liquid and scum formation are substantially reduced. When the hydrolysis agent is, for example, an inorganic acid such as sulfuric acid and it is fed to the mixing chamber in concentrated form, it is preferable that additional water be added or injected into the mixing chamber so as to help with the dilution of the hydrolysis agent. The dilution of hydrolysis agent in the mixing chamber further aids in reducing or eliminating carbonization of coffee solids and scum formation.

In the operation of the extraction process at steady operating conditions utilizing the system shown in FIG. 2, valve 112 is opened (all other valves remaining closed) so that metering pump 117 provides a continuous predetermined feed of a hydrolysis agent into mixing chamber 71 where it is mixed with aqueous extraction liquid introduced through line 123. Additional water as hereinbefore mentioned may also be injected into mixing chamber 71. A heat-exchange medium, e.g., cold water, may be circulated through heat exchange line 79 in order to control the temperature at the desired level. The extraction solution containing hydrolysis agent is passed through heat exchanger 95 and then introduced into the lower portion of column 63. The flow of hydrolysis agent into mixing chamber 71 is continued throughout the aqueous extraction period which may range from about 20 minutes to about 90 minutes. When the desired portion of solubles in the coffee grounds in column 60 are extracted, column 60 is disconnected from the system and simultaneously a column filled with fresh ground coffee is connected into the system so as to follow column 67. Valve 112 is closed and valve 113 is now opened so as to provide a continuous predetermined feed of hydrolysis agent into mixing chamber 72 where it is mixed with extraction liquid from line 124. The extraction liquid from the mixing chamber 72 is passed through heat exchanger 96, then introduced into the lower portion of column 64 and passed through the successive columns of the system. When the desired portion of solubles in the coffee grounds in column 61 are extracted, column 61 is cut out of the system and the procedure repeated. The aqueous extract which is continuously withdrawn from the column holding the freshest coffee grounds contains the soluble hydrolysis product produced in addition to the other desirable soluble coffee solids extracted.

The water extraction of the coffee grounds and the hydrolysis of appreciably extracted coffee grounds may be carried out over a wide range of temperatures and at pressures which maintain liquid phase operations within the extraction system. Preferably the temperatures employed are such that the total time for concurrently carrying out the extraction and the hydrolysis may range from about 20 minutes to about 90 minutes.

Either an alkaline or acid hydrolysis may be utilized to effect hydrolysis of the coffee grounds. Preferably, an acid hydrolysis is employed. Acid agents, for example, inorganic acids such as sulfuric acid, phosphoric acid or the like may be satisfactorily utilized. As indicated previously, the hydrolysis agent is continuously supplied to the appropriate column at a predetermined rate or amount during the entire extraction period. For example, if each column of the system was charged with 300 pounds of coffee grounds, the extraction period was about 60 minutes and the hydrolysis was to be effected by utilizing 3 pounds of sulfuric acid per 300 pounds of dry coffee grounds, the acid would be continuously fed into the appropriate column at the rate of about 0.05 pound per minute.

The amount of the increase in the yield of soluble coffee solids will depend upon such factors as the process conditions, the level of extraction, the coffee blend, the coffee roast, and the amount of hydrolysis agent fed per pound of dry coffee.

The following table indicates the relationship between the increase in the yield of soluble solids and the quantity of hydrolysis agent, sulfuric acid, fed into the extraction column. The process conditions, coffee extraction level, coffee blend and roast levels were substantially the same for each run. As set forth below, the given increase in yield represents the approximate additional amount or percent of soluble solids obtained over and above the yield obtained from a coffee of similar blend and roast subjected to the same extraction process conditions but with no induced hydrolysis.

*Sulfuric Acid*

| Pounds per pound of dry coffee charged | Pounds per 300 pounds dry coffee charged | Increase in yield, percent |
|---|---|---|
| 0.0040 | 1.2 | 4 |
| 0.0053 | 1.6 | 6 |
| 0.0073 | 2.2 | 9 |
| 0.0100 | 3.0 | 12 |

The hydrolysis agent is preferably fed and brought into contact only with coffee grounds from which at least 15 percent by weight of soluble solids has been previously extracted. In other words, only such grounds should be subjected to hydrolysis conditions if a product of high quality is to be obtained. In order to prevent the hydrolysis agent from contacting fresh coffee grounds which have not been extracted to the desired degree, to prevent the presence of hydrolysis agent in the extract, and to eliminate the need of recovering, neutralizing or destroying the hydrolysis agent, a sufficient quantity of adequately extracted coffee grounds should be present in the column or columns immediately succeeding the column into which the hydrolysis agent is introduced to adsorb hydrolysis agent brought into contact therewith. In other words, the hydrolysis agent is preferably fed into a column containing coffee grounds which have had appreciably more than about 15 percent by weight of soluble solids extracted therefrom, say, for example, about 25 percent or more, so that one or more of the columns succeeding the column into which the hydrolysis agent is fed will contain coffee grounds which have been extracted to the desired level, i.e., coffee grounds from which at least 15 percent by weight of the coffee has been extracted as soluble solids.

The hydrolysis as contemplated by the present invention may be readily incorporated into existing extraction processes without requiring appreciable modification of the process conditions. Moreover, the present hydrolysis permits the extraction to be carried out at lower temperatures so that without a sacrifice in yield a more improved coffee product can be produced. Additionally, the present process which is readily adaptable to present day semi-continuous and continuous coffee extraction equipment, permits each different coffee product to retain its own individual organoleptical properties. Furthermore, since the additional soluble solids obtained are essentially tasteless it is difficult to distinguish in taste soluble coffee containing hydrolysis product from soluble coffee containing little or no hydrolysis product.

Since certain changes may be made in the above process without departing from the scope of the invention herein involved, it is intended that all matter contained in the above description, or shown in the accompanying drawing, shall be interpreted as illustrative and not in a limiting sense.

What is claimed is:

A process for producing a coffee extract which comprises countercurrently contacting progressively fresher ground coffee which has had at least 15% by weight thereto contacting with a hydrolysis agent at least a portion of the ground coffee which has had at least 15% by weight thereof extracted as soluble solids, and recovering a coffee extract comprising water and soluble coffee solids including an essentially tasteless hydrolysis product, said hydrolysis agent being introduced into said column at a point where the coffee beans have been extracted appreciably more than 15%, the amount of hydrolysis agent being sufficient to increase the yield of soluble coffee produced by at least 4% over the percentage of soluble solids extracted without addition of such agent under similar extraction conditions of time, temperature and pressure, thereafter passing said aqueous solution containing the resultant hydrolysis product through coffee beans which have been extracted at least 15% to absorb unreacted hydrolysis agent, thereafter passing said aqueous stream through progressively less extracted coffee, the portion of the aqueous stream passing through coffee which has been extracted by less than 15% being essentially free of any hydrolysis agent.

References Cited by the Examiner
UNITED STATES PATENTS
2,687,355   8/1954   Benner et al. _____ 99—71

A. LOUIS MONACELL, Primary Examiner.
ABRAHAM H. WINKELSTEIN, Examiner.